TELEVISION CIRCUITS

Filed Feb. 11, 1954

3 Sheets-Sheet 1

INVENTOR.
Leonard Dietch
BY [signature]
ATTORNEY

TELEVISION CIRCUITS

Filed Feb. 11, 1954

3 Sheets-Sheet 2

INVENTOR.
Leonard Dietch
BY [signature]
ATTORNEY

May 28, 1957 L. DIETCH 2,794,065

TELEVISION CIRCUITS

Filed Feb. 11, 1954 3 Sheets-Sheet 3

INVENTOR.
Leonard Dietch
BY [signature]
ATTORNEY

United States Patent Office 2,794,065

Patented May 28, 1957

2,794,065

TELEVISION CIRCUITS

Leonard Dietch, Pennsauken, N. J., assignor to Radio Corporation of America, a corporation of Delaware Application February 11, 1954, Serial No. 409,576

18 Claims. (Cl. 178—5.4)

This invention relates to improved circuits for the protection of deflection circuits and more particularly to improved circuits for the protection of television receiver circuits which are used for driving combined horizontal scanning circuits and pulsed high voltage power supplies to provide kinescope second anode or ultor voltage.

The invention also has further application as an improvement in color television systems where protection is also afforded to the combination of circuits involving pulse type power supplies, horizontal scanning and burst keying.

The use of separate power supplies, is, of course, a common technique in many types of communication systems, however, as was found in the earlier television receivers, the employment of a separate high voltage supply to drive the kinescope presented several disadvantages. Since the power demands made by the kinescope, even at high voltage, are very low, it was found to be advantageous to combine the circuits involving the high voltage power supply and the deflection circuits in a manner which represented not only a simplicity in operation but also an economy in the number of system components used and the cost of the circuits involved. With the coming of color television a new duty has been imposed upon the deflection circuits, namely that of providing a keying of the color synchronizing burst circuits so that the color synchronizing information, which is present in a color television signal, can be separated from this signal and applied to appropriate circuits to accurately synchronize the color circuits of the color television receiver with that of the transmitter which is sending out the color signals. As these combined circuits took on new duties and became more complicated, the voltage and power demands increased due to the demand for kinescopes with increased size of screen. This then imposed additional requirements with regard to the current necessary in the various tubes which are involved in the combined circuits. In such combined circuits it is very difficult to provide adequate protection for each individual portion of the circuit, particularly since such circuits, in commercial receivers are operated near or at full capacity and highest current ratings. The present invention is therefore a useful and important improvement in providing the necessary protection of circuits in a color television receiver which combine the duties of horizontal deflection, high voltage power supply, and burst keying.

It is therefore an object of this invention to provide an improved means for protecting the horizontal deflection circuit in a television receiver.

It is another object of the present invention to provide an improved means for protecting the driving tube of an ultor voltage power supply.

It is yet another object of this invention to provide a means for controlling the maximum current afforded to the drive circuit of a combined ultor power supply and horizontal scanning circuit.

It is yet another object of this invention to afford protection to a combined ultor power suply, a horizontal scanning circuit, and a burst keying circuit in a color television receiver.

According to this invention a pentode is used to drive the horizontal output and ultor circuit; the screen current to this pentode is principally supplied by a control electron tube whose control grid is biased by the horizontal output system. If failure in the drive is experienced, the lack of output voltage causes the control electron tube to bias itself off which therefore limits the screen current and thereby the screen voltage of the pentode resulting in the protection of this tube. The control electron tube is so included in the protection circuit as to also provide a burst keying voltage.

Other and incidental objects of this invention will become apparent upon a reading of the following specification and an inspection of the drawings in which:

Figure 1*a* shows an elementary cyclic scanning circuit;

Figure 1*b* shows the current behavior associated with the circuit shown in Figure 1*a*;

The circuits in the systems to be described are particularly applicable for application in both monochrome and color television receiver circuits. However, the present invention also finds considerable application in communication circuits which involve radio frequency and pulse driven power supplies and also circulating current networks thereby permitting a protection of a key driving stage controlling the systems so that should failure of drive or failure of these systems take place the key driver stage need not be subjected to an over-voltage or an over-current thereby resulting in tube or circuit failure. It is to be noticed in the following specification that the present invention as specifically applied to a color television receiver also affords the very useful property of supplying burst keying voltage which can be utilized either to key the color synchronizing burst or to perform other useful functions in a color television receiver which are based upon the information contained in either the amplitude, the frequency or the phase of the color synchronizing burst.

Figure 1:
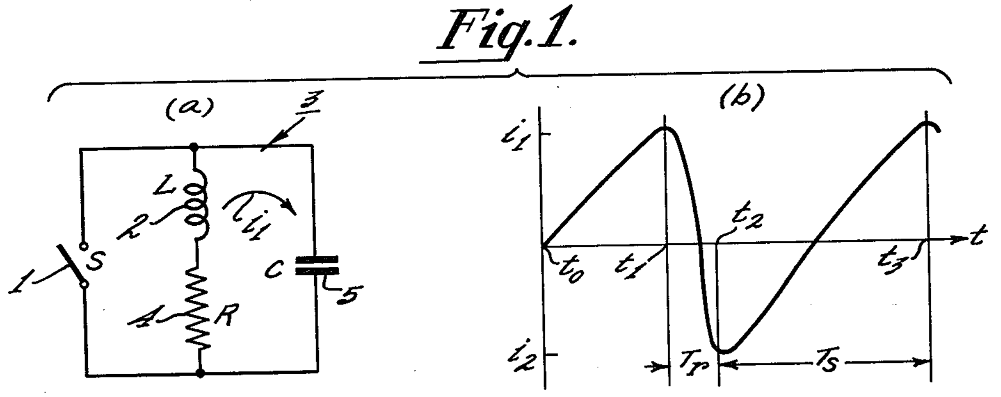

Before the discussion of the operation of the protective circuit which constitutes the present invention, it is instructive to study first the circuits which are to be protected. Consider first the operation of the basic scanning system which is shown in Figure 1*a*. In the circuit shown in Figure 1*a* consider the RLC circuit 3 in which L and R represent the inductance 2 and the resistance 4 of a set of deflection coils, respectively, C is the lumped stray capacitance 5 present, and the switch 1 represents some suitable vacuum-tube mechanism. This circuit produces what is called cyclic scanning. The chief advantage of such a system is that an ideal cyclic-scanning system requires only wattless power as compared, for example, with the 50 watts necessary to produce full deflection of the beam with a deflection angle of 50° at 10 kv. using circuits such as those used in television receivers prior to World War II. This is an important commercial consideration.

Let the switch be closed at $t=t_0$. The current will rise linearly through the indictance 2 at a rate prescribed by the time constant of the RL circuit. This rise is pictured in Figure 1*a* for the time interval $t_0<t<t_1$. At $t=t_1$, let the switch 1 be opened. The stored energy in the inductance 2 will be converted into potential energy in the capacitor and back to magnetic-field energy in substantially one-half cycle of oscillation of this circuit. The return time (retrace time) $t_1<t<t_2$ is evidently equal to $$t_2-t_1\approx\pi\sqrt{LC} \qquad (1)$$

If the switch 1 is opened at $t=t_2$, the current will go from $i_{min}$ to zero at a rate approximately equal to (letting E be the battery potential)

$$\frac{di}{dt}=\frac{E}{L} \qquad (2)$$

from which point on it will rise again as it did at $t=0$. At $t=t_3$, the switch 1 is opened, and the process begins again, repeating the waveform pictured between $t_1<t<t_3$.

In an actual television system, the scanning circuit must be designed to yield a linear trace approximately 53 $\mu$sec. long and a retrace interval of 10 $\mu$sec. If the cyclic-scanning system is used, the RLC circuit 3 must be designed to have a half period commensurate with that required for the trace. However, as it stands, the linearity of the sweep current which the basic circuit yields leaves much to be desired. Consider then the practical refinement of this system as illustrated by the elementary horizontal output pulse power source, and reaction scanning circuit shown in Figure 2. Its operation is described as follows:

During the latter part of the horizontal trace, the output tube 7 conducts very heavily and builds up a strong magnetic field in the deflection yoke 14 and output transformer 10. When a negative pulse is applied to the grid of tube 7, its plate current is suddenly cut off and the magnetic field in the transformer and deflection coil begins to collapse at a rate determined by the resonant frequency of the system. If the coil were not damped, it would continue to oscillate at its natural frequency. To prevent this oscillation from occurring, a reaction scanning tube 17, which is incorporated into a modified damper circuit, is connected across the deflecting yoke 14. When the voltage on the reaction-scanning-tube plate 19 becomes positive with respect to its cathode 21, it begins to conduct heavily and the field begins to decay at a rate permitted by the load which the reaction scanning tube has placed on the coil 13 and yoke 14. The circuit constants are such that this decay is linear and at a rate suitable for the visible trace.

If no additional energy were fed into the coil, the field would fall to zero and the deflection coil current approaches its final quiescent asymptotically. It is therefore necessary to have the output tube 7 begin to supply power to the deflection yoke 14 before energy in the yoke 14 is completely dissipated. Although the curves relating to the currents supplied by the output tube 7 and by the decaying field with respect to time are curved together they produce a current that is linear.

By the time the yoke current has reached its maximum value, the output tube 7 is conducting heavily and has built up a strong field in the transformer 10 and yoke 14. At this point, the output tube 7 is again suddently cut off and the process is repeated.

The picture tube high voltage power or ultor supply may be obtained from the energy stored in the deflection inductances during each horizontal scan. When the plate current of the tube 7 is cut off by the incoming signal 6 a positive pulse appears in the transformer primary 8 due to the collapsing field in the deflection current. By utilizing the coil 9 this pulse of voltage is stepped up to the very high value required by the particular kinescope used. This stepped-up voltage is then rectified by rectifier 11, filtered using capacity 23 and applied to the terminal 16 from which this voltage may be applied to the picture kinescope. Since the frequency of the supply voltage is very high, namely 15,750 cycles per second, relatively little filter capacity is necessary.

Figure 2:
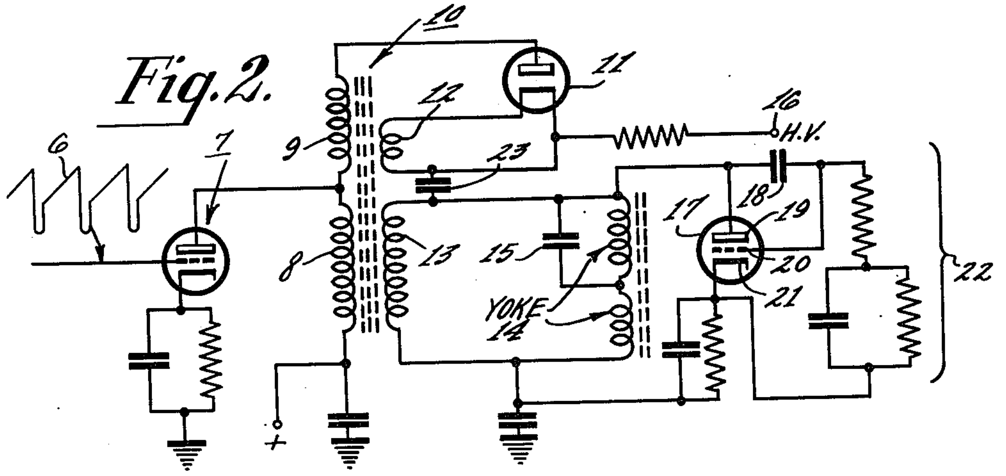
Figure 2 shows a basic cyclic scanning circuit which includes an R. F. power supply and a damper tube for linearity control.

The circuit in Figure 2 also includes a filament winding 12 which becomes a part of the overall transformer 10. This filament winding is included in the transformer 10 so that it may be properly insulated for the very high voltage at which the cathode of the rectifier 11 will operate and eliminates the necessity of building a separate filament transformer.

There are many different ways of combining a cyclic scanning system and a radio frequency high voltage rectifier; a basic one has already been discussed in relation to Figure 2. For extensive details of other methods of operating such combined circuits see, for example, "Television deflection circuits" by A. W. Friend in pages 98 to 138 in the RCA Review for March 1947, or "Characteristics of a high efficiency deflection and high voltage supply systems for kinescopes" by O. H. Schade in pages 5 to 37 in the RCA Review for March 1950. For a more general discussion of deflection circuits see chapter 11 of the book "Harmonics, Sidebands and Transients in Communication Engineering" by C. Louis Cuccia, McGraw-Hill Book Co., Inc., of New York, published in 1952.

Figure 3:
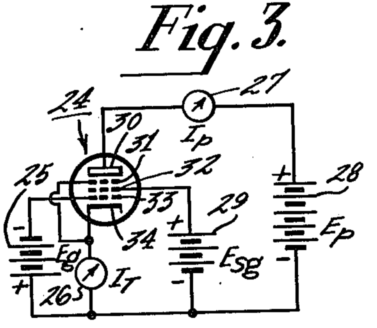
Figure 3 shows the basic circuit of a pentode.

Another fundamental concept which is associated with the present invention is one dealing with the operation of a pentode. The pentode, as its name implies, is a five-electrode tube. The five electrodes are illustrated in the tube 24 in Figure 3, and are in order the cathode 34, the control grid 33, the screen grid 32, the suppressor grid 31, and the plate 30. The suppressor grid 31 is added to the screen grid 32 to eliminate the exchange of secondary electrons between the screen grid 32 and the plate 30. It is invariably a coarse-mesh grid placed between the screen grid 32 and the plate 30 and operated at cathode potential. At this cathode potential it is able to suppress secondary electrons by causing a deep dip in the potential between the screen grid 32 and the plate 30 while at the same time its coarse-mesh allows electrons to pass on through the plate. This eliminates the exchange of secondary electrons between the screen grid 32 and the plate 30 and results in current voltage characteristics which are almost exactly those which occur in a perfect screen grid tube for no secondary emission. Of all of the various types of vacuum tubes, the pentode is probably the one in most extensive use. It is used at audio frequency because a higher gain per stage can be realized than with a triode. It is used at radio frequencies because the extremely low control-grid-to-plate capacity virtually eliminates the possibility of regeneration. Even as a power tube it finds considerable use because of its low control grid current and hence the power necessary to drive it is lower than that for the corresponding triode.

One aspect of the pentode which applies to the present invention is the control which the potential on the screen grid 32 has over the plate current of the tube. Note in Figure 3 that a grid voltage $E_g$ 25 is applied to the control grid 33. A screen grid voltage $E_{sg}$ 29 is applied to the screen grid 32. The suppressor grid 31, as previously described, is connected directly to the potential of the cathode 34. In the anode circuit is included the ammeter 27 and the plate voltage supply 28 which delivers a voltage $E_p$. An additional ammeter 26 is included which reads $I_T$, which is the total current of the pentode and reads both the current collected by the plate 30 and by the screen grid 32.

Figure 4:
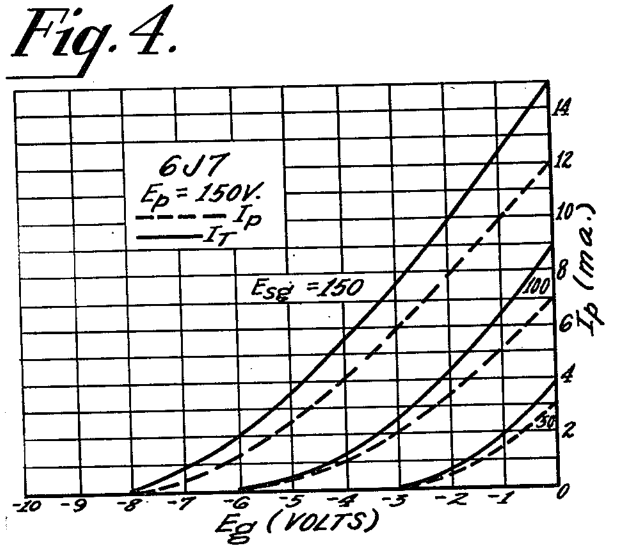
Figure 4 shows the plate current-control grid voltage characteristics of a type 6J7 pentode.

Figure 4 shows some typical characteristics of the plate current versus grid voltage operation of the 6J7 tube for the case where the plate voltage $E_p$ is maintained constant at 150 volts. The solid line describes the total current $I_T$, and the dashed line describes the plate current $I_p$. It is evident from the curve in Figure 4 that as the screen grid potential is varied from 150 volts to 50 volts, a considerable control is exercised over the amount of plate current which is produced by a particular value of grid voltage applied to the pentode. It is evident therefore that should a pentode be used as a driving control tube in a communication circuit the potential applied to the screen grid may be a controlling factor in either limiting the total plate current produced by the pentode or actually reducing the amount of plate current to a prescribed value by introducing a suitable reduction in the voltage applied to the screen grid.

Figure 5:
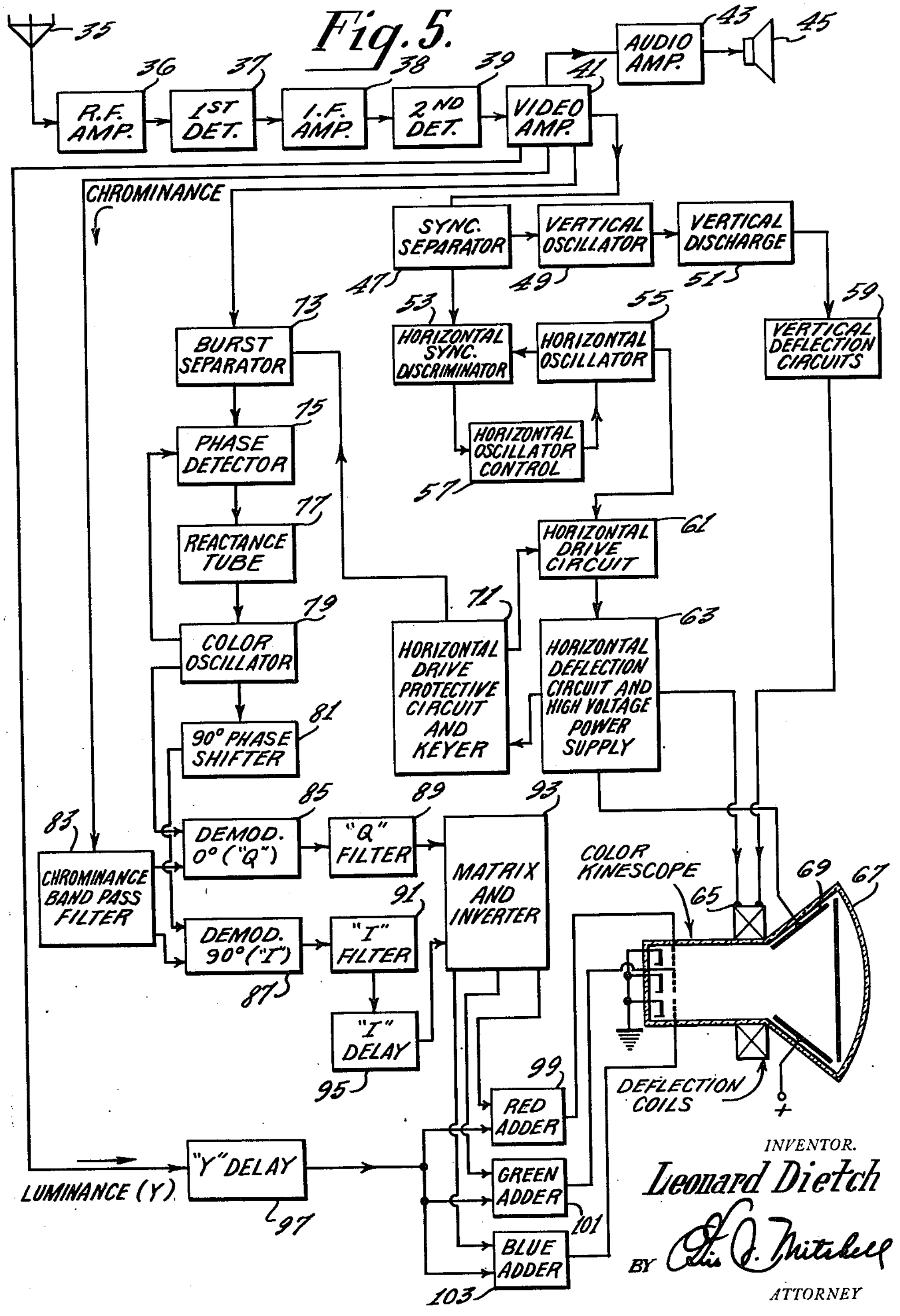
Figure 5 shows the block diagram of a color television receiver which utilizes the present invention.

The present invention is applicable for control and failure protection in not only a combined ultor power supply and deflection circuit, but also one which yields the function of burst keying such as is employed in color television receivers. It is therefore instructive to discuss at this point the overall operation of such a color television receiver, the block diagram of which is shown in Figure 5. The incoming video signal arrives at the antenna 35.

This video signal, which is used to modulate the carrier with the transmitter, includes five types of information. One is the luminance information which corresponds to the black-and-white information of a monochrome television picture. Another is the chrominance information which describes the hues and saturations of the color picture. The third type of information is the scanning and blanking information which is used to actuate the deflection circuits of the television receiver so that the picture will appear on the face of the television tube. The fourth type of information is the color synchronizing information which is used to accurately synchronize the color circuits of the color television receiver with those of the corresponding circuits in the television transmitter. This color synchronizing information is transmitted in the form of a burst of approximately 8 mc. of the color subcarrier frequency on the back porch of the horizontal synchronizing pulse which is part of the deflection synchronizing information transmitted. The precise phase of this color synchronizing burst is utilized to supply the necessary synchronism of the color circuits in the color television receiver. The fifth type of information is the sound information associated with the television signal.

This video signal now appearing with the carrier is applied from the antenna 35 to the radio frequency amplifier 36 and impressed on the first detector 37. The output of the first detector is applied to the I. F. amplifier 38 and then to the second detector 39 where the video signal is recovered. The output of the second detector is applied to the video amplifier.

The sound information is separated from the picture information in the video amplifier 41 using the well-known principle of intercarrier sound. This sound information is passed through the audio amplifier 43 and applied to the loud speaker 45. The deflection synchronizing information is separated from the video signal by the sync separator 47 which simultaneously drives the vertical oscillator 49 and synchronizes the horizontal oscillator 55. The synchronization of the horizontal oscillator 55 is obtained by applying the horizontal synchronizing information to the horizontal sync discriminator 53. A suitable signal is sent from the horizontal oscillator 55 into the horizontal sync discriminator 53 which is compared with the incoming horizontal synchronizing information and then used to operate the horizontal oscillator control 57 which applies a suitable control voltage to the horizontal oscillator 55 should its phase and frequency deviate from that prescribed by the horizontal synchronizing information. Thus far what has been achieved is then a horizontal oscillator 55 and a vertical oscillator 49 which develop waveforms which are in synchronism with the incoming synchronizing information. The vertical ocillator waveform 49 is passed through a vertical discharge circuit 51 which is used to actuate the vertical deflection circuit 59 which drives the vertical deflection yoke in the deflection coil 65. The horizontal oscillator 55 output is used to drive the horizontal drive circuit 61 which in turn drives the horizontal deflection circuit 63, the output of this circuit being used to control the horizontal deflection yoke in the deflection coil 65. The luminance information is the black-and-white or monochrome information which is passed through the Y delay circuit 97 and then applied simultaneously to the red adder 99, the green adder 101, and the blue adder 103, in which circuits the luminance and the color information will be combined so that the proper luminance and color signals will appear at the control grids of the tri-color kinescope 67. The chrominance information is passed through the chrominance band pass filter 83 which has a pass band from approximately 2 to 4.1 mc. thereby eliminating to as great a degree as possible any of the luminance information which is present in this portion of the video spectrum. The output of the chrominance band pass filter 83 is then applied to two synchronous demodulators 85 and 87.

The use of the synchronous demodulators in the color television receiver is based on the fact that the chrominance information is incorporated in the transmitted signal by use of a modulated color subcarrier. The color information may, in one form of transmitter, be formed as a pair of signals known as I and Q signals which contain suitably combined amounts of red, green, and blue signals. It is to be noted that the red, green, and blue information is in the form of color-difference information, this color-difference information referring to the deviation from a prescribed combination of red, green, and blue signals which yield a white output on the color reproducer. The I signal is a wide band signal having three-color information described by color harmonic components in the spectrum range up to ½ mc., and two-color information along the orange-cyan line from approximately ½ mc. to 1½ mc. The Q signal is a narrow band color signal which contains the color information components up to approximately ½ mc. An excellent description of the overall television system including all pertinent aspects of the use of I and Q signals is included in the paper "Principles and development of color television systems" by G. H. Brown and D. G. C. Luck on pages 144 to 204 in the RCA Review, June 1953. In the original modulator at the transmitter the I and Q signals are modulated upon two subcarriers of the same frequency but 90° apart in phase. The frequency involved is 3.579 mc. The modulators employed are of the doubly-balanced type so that both the carriers and the original I and Q signals are separated leaving only the sidebands. To comply with the NTSC color signal specifications as approved by the Federal Communication Commission on December 17, 1953, the phase of the burst of the color synchronizing burst should be 57° ahead of the I component (which leads the Q component by 90°).

Returning now to the handling of the chrominance information in Figure 5, we have arrived at the point where the chrominance signal from the chrominance band pass filter 83 is impressed on the demodulators 85 and 87. In order for synchronous detection to take place it is necessary to develop suitable phased locally generated color subcarrier signal, the phase of this locally generated color subcarrier signal being accurately determined by the incoming color synchronizing burst. This signal is produced by first passing the video signal through the burst separator 73 which is keyed on during the duration of the burst by a pulse keyer 71. This burst is then applied to the phase detector 75. At the same time a color oscillator 79 puts out the locally generated signal. This locally generated signal is applied also to the phase detector 75. Should a different phase and frequency exist between the output of the color oscillator 79 and the burst as provided by the burst separator 73, the phase detector 75 will generate a suitable error signal which will be applied to the reactance tube circuit 77 which will in turn return the frequency and phase of the color oscillator to precisely that described by the color synchronizing burst. It is to be noted that this is only one of many ways in which accurately synchronizing a locally generated color signal can be produced—ringing circuits and injection synchronism systems also finding usage. The color oscillator output from the color oscillator 79 is then applied to the Q demodulator 85 and to the I demodulator 87, the signal to the latter being passed through a 90° phase shifter 81 which provides the correct phase shift so that synchronous detection can take place. The Q signal, as recovered from the Q demodulator 85, is then applied at approximately ½ mc. The I signal, as recovered from the I demodulator 87, is then passed through the I filter 91 which usually has a characteristic whereby the frequency components from 0 to ½ mc. are passed through at one level and the signal components from ½ mc. to 1½ mc. are passed through at approximately twice this level so that the loss in sideband energy due to the use of the single sideband transmission techniques is compensated for. This I signal is then passed through the I delay line 95 with the resulting filtered I and Q signals applied to the inverter and matrix circuit 93 which apply the proper color-difference signals to the red adder 99, the green adder 101, and the blue adder 103 where these color-difference signals are combined with the luminance signal to yield red, green, and blue signals which can then be applied to appropriate control grids in the color kinescope 67.

Some degree of protection must be afforded the horizontal drive circuit. In the event that synchroguide or some other type of drive stage fails, some means must be provided to prevent the horizontal output tube from drawing excessive current. The excessive current causes the dissipation of the horizontal output tube to increase considerably resulting in the rapid deterioration of this expensive tube, and also possibly fire hazard. To prevent this, some means must be provided to hold the current passing through the horizontal output tube in the horizontal output circuit within safe limits with the horizontal drive failure. The present invention, therefore, provides means for adding this result utilizing tubes and components and circuitry which already exist in many color television receiver circuits.

Figure 6:
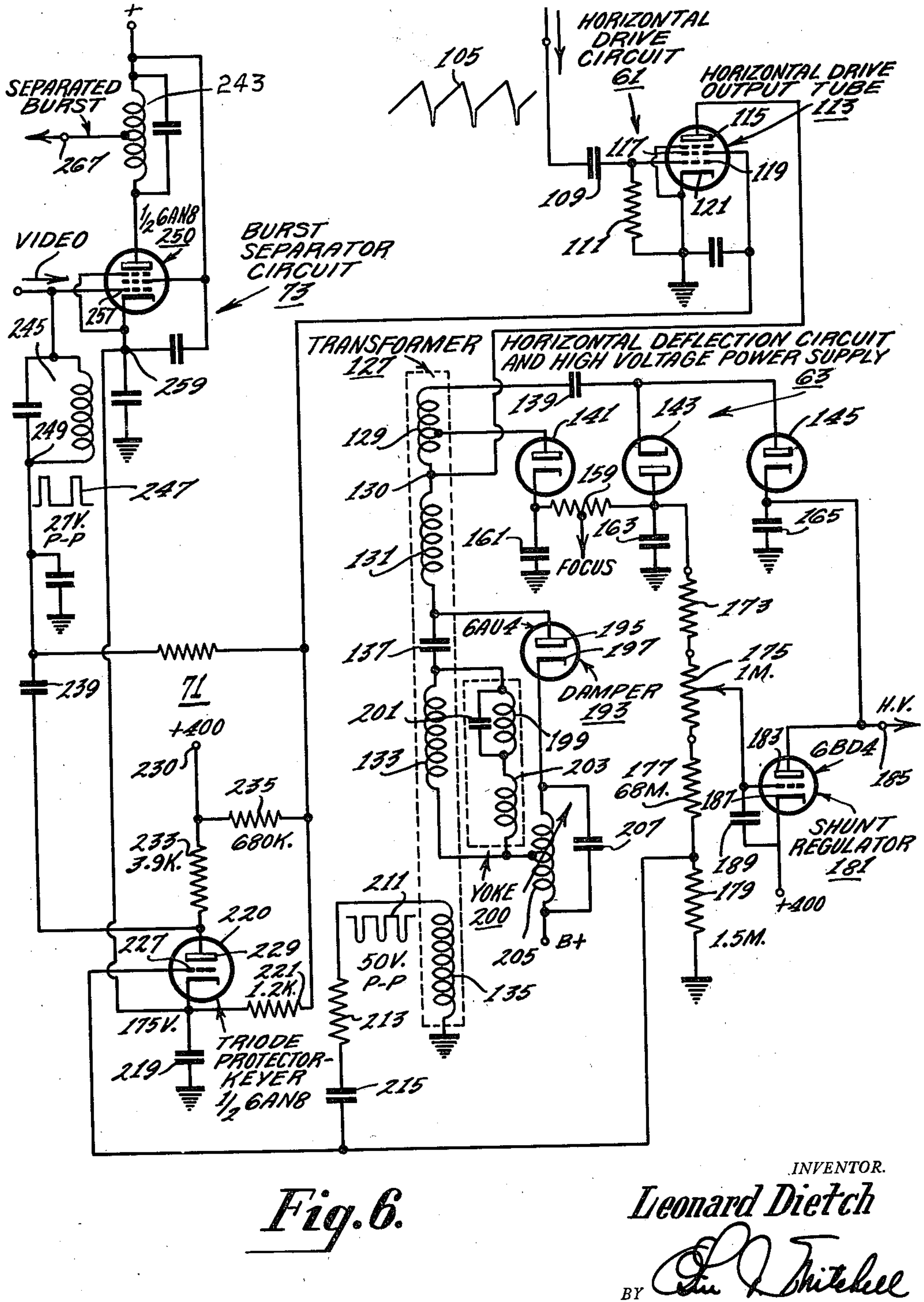
Figure 6 shows one embodiment of the present invention which utilizes a triode protector-keyer tube.

Turning now in detail to the present invention, consider the embodiment shown in Figure 6. Here a suitable waveform 105 from the horizontal oscillator and associated circuits is applied to the horizontal drive circuit 61. The waveform 105 is applied through the resistance-condenser circuit made up of the condenser 109 and the resistor 111 which act in conjunction with the grid 119 and cathode 121 of the horizontal drive output tube 113 to perform as a self-biasing clipping circuit. The anode 115 of the horizontal drive output tube 113 is connected to the terminal 130 on transformer 127. The rectifier 145 in conjunction with the condenser 165 is fed by voltage from the winding 129 by way of condenser 139 and develops a high voltage at the output terminal 185. The horizontal deflection circuit and high voltage supply 63 is therefore caused to operate in a manner basically that described in the more elementary circuit shown in Figure 2. However, there are additions which are incorporated in the horizontal deflection circuit and high voltage power supply 63; i. e. the kickback winding 135 which produces the waveform 211 which may be used for the burst keying; the combined circuit made up of the rectifier 141 and the rectifier 143, and the combined resistance network made up of the resistance 173, the potentiometer 175, the resistor 177 and the resistor 179 forms a voltage source based on the output of the transformer 127. Filtering of this voltage source is provided by the condensers 161 and 163 and regulation of the high voltage power supply circuit is then obtained by the section of the shunt regulator tube 181 whose grid voltage is derived for the potential afforded by the potentiometer 175; the shunting action of the shunt regulator tube 181 will therefore be controllable so that variations in voltage appearing at the potentiometer 175 will cause a variation in the shunting action of the shunt regulator 181 in such a way that should the voltage increase, the shunt regulator circuit will present an increased load on the high voltage power supply thereby reducing the output voltage, and should the output voltage appearing across the output terminal 185 decrease, then the shunt as afforded by the shunt regulator circuit 181 will be decreased thereby allowing the voltage to rise so that the output voltage will be maintained substantially constant—an important factor in maintaining a clear and steady picture on the face of the color kinescope. The horizontal deflection circuit involves the use of the transformer coil 133, the yokes 200, the condenser 201, the damper tube 193, and the condenser and coil circuit made up of the center-tapped coil 205 and the condenser 207.

Let us now consider separately the burst separator circuit 73. This burst separator circuit 73 uses the pentode 250 on whose control grid the video signal is impressed. In the control grid circuit is the resonant circuit 245 which is tuned to the color subcarrier frequency. In the anode circuit of the tube 250 is another resonant circuit 243 also tuned to the color subcarrier frequency. If the potential applied to the terminal 249 is such that the tube 250 will be rendered conducting, then the video signal which is applied to the grid 257 will be amplified by the burst separator circuit 73. However, since only the burst is to be transmitted through the tube 250 and amplified, it is important that the tube 250 be rendered conducting only during a suitable portion of the burst interval or possibly an interval of time slightly greater than the burst interval. This is done by applying appropriate potentials to the terminal 249 as shown. If the potential wave 247 having 27 volts peak-to-peak is applied to the pentode section of a 6AN8, and, if the pulse of the waveform 247 is timed to coincide with the duration of the synchronizing pulse, the tube 250 will be rendered conducting only during the burst time; the burst will, therefore, be separated from the video signal which is applied to the grid 257, will be amplified by the amplifier tube 250, and will appear across the resonant circuit 243; the terminal 267 will then yield the separated burst signal which can then be used for color signal synchronization.

Consider now the circuit associated with the triode protector-keyer 71 which forms the associated key network of the entire circuit and embodies the principles being set forth in the present invention. Note that the triode section of a 6AN8 is used to provide the triode 220 of the triode protector-keyer circuit 71. To the anode 229 of this tube is connected a resistor 233 whose other end is then connected to the 400 volt terminal 230. Note too the resistor 235 whose magnitude is 680K ohms and the resistor 221 which is only 1.2K ohms, with the plate resistor 233, 3.9K ohms. The screen grid potential applied to the screen grid 117 of the horizontal drive output tube 113 is derived from the 400 volt potential terminal 230 through the associated circuits, resistors and triode protector-keyer tube.

Consider the condition now where the triode protector-keyer tube is cut off. Then the potential as applied to the screen grid 117 will be a function of the current passing through the resistor 235 alone; this will involve a rather large voltage drop because of the large value of the resistor, therefore yielding a reduced voltage on the screen grid 117 and therefore reducing current through the horizontal output drive tube 113. When the triode protector-keyer tube 220 is conducting, however, note that another path is afforded for the current to pass to the screen grid 117, this current path being in the form of the circuit provided by the resistor 233, the triode 220 and the resistor 221. This is a much lower resistance path than that afforded by the resistor 235. A larger percentage of the voltage as provided by the terminal 230 will therefore be applied to the screen grid 117, and the horizontal drive output tube will therefore provide higher current output and a higher drive voltage for the horizontal deflection circuit in high voltage power supply 63.

The protective operation of the triode protector-keyer circuit 71 is dependent on the bias voltage which is applied to the grid 227 of the tube 220. This bias voltage is obtained from the potential built up across the resistor 179 in the high voltage power supply circuit 63 and is so arranged that should the horizontal drive circuit 61 be incapacitated either due to lack of drive from a preceding circuit or due to failure of the circuit in its own right, no voltage will appear across the resistor 179. This will cause the triode protector tube 220 to either cut off or to have its conduction reduced to a very low value thereby reducing the screen grid voltage as applied to the screen grid 117, and resulting in low current passing through the horizontal drive output tube 113. It is evident that protection of this horizontal drive output tube has therefore been afforded. If the horizontal drive circuit is not incapacitated, then the high voltage appears in the high voltage power supply circuit 63. Suitable positive voltage appears across the resistor 179 and the triode protector-keyer tube 220 is rendered conducting to a high level. The combined circuit of the resistor 233, the triode protector-keyer tube 220 and the resistor 221 affords a considerably lower resistance than that afforded by the resistor 235; a much higher voltage appears at the screen grid 117 of the horizontal drive output tube 113 and the horizontal drive output tube 113 is permitted to operate then at full capacity.

The burst keying as provided by the triode protector-keyer circuit 71 is derived from the output of the kickback coil 135 which is then passed through the differentiator made up of the resistor 213 and the condenser 215 and applied to the grid 227 of the triode protector-keyer tube 220. This causes the triode protector-keyer tube to change conduction also in accordance with the differentiated output of the kickback coil 135. Because of the resistor 233 this differentiated kickback voltage will be developed at the anode 229 of the triode protector-keyer tube 220. If the constants of the differentiated circuit made up of the resistor 213 and the condenser 215 are of suitable design, and if the resistance 233 and the condenser 239 are also made of suitable magnitude, the waveform 247 will appear at the grid terminal 249 in proper time sequence as related to the burst interval thereby yielding keying action of the burst separator circuit 73.

Having described the invention, what is claimed is:

1. Electron tube protective apparatus comprising in combination, an electron tube having a control grid, a cathode, a current limiting control electrode, and an anode, a driving signal source, an output circuit, a resistance-condenser network, means for coupling said resistance condenser network to the grid and cathode of said electron tube to produce a self-biasing clipping circuit, means for coupling said driving signal source to said self-biasing clipping circuit, means for coupling said output circuit to the anode of said electron tube, means for operating said electron tube whereby reduction in amplitude of the output of said driving signal source causes an increase in current through said electron tube, means for developing a reference voltage in the output circuit of said electron tube, said reference voltage having an amplitude proportional to the amplitude of the driving signal from said driving signal source, a high voltage terminal, and electron control device means coupled between said high voltage terminal and said current limiting control electrode responsive to said reference voltage whereby should the amplitude of the driving signal from said driving signal source decrease, the potential presented to said current limiting control devices as derived from said reference voltage will limit the current through said electron tube to a prescribed value.

2. Electron tube protective apparatus comprising in combination, an electron tube having a control grid, a cathode, an electron flow-limiting control electrode, and an anode, a driving signal source having an output of prescribed waveform, a resistance capacitance network coupled to the grid and the cathode of said electron tube to produce an input circuit which yields control of electron flow through said electron tube whereby said electron flow varies inversely with respect to the amplitude of signal having said prescribed waveform impressed on said input circuit, means for coupling said driving signal source to said input circuit, an output circuit coupled to the anode of said electron tube, potential means, a resistor placed in series with said potential means between said electron-flow-limiting control electrode and said cathode to yield a condition of reduced electron flow, an electron tube means responsive to a control voltage whereby said electron tube means is rendered conducting for a first range of control voltages and nonconducting for a second range of control voltage, means for producing a reference voltage in said output circuit with said reference voltage proportional to the amplitude of said driving signal source output, means for shunting said resistor with said electron tube means, and means for utilizing said reference voltage to act as a control voltage for said electron tube means whereby when the driving signal source output falls below a prescribed amplitude, said electron tube means is rendered nonconducting and said resistor serves to limit electron flow and when said driving signal source output increases above said prescribed amplitude, said electron tube means is rendered conducting thereby producing a damping action across said resistance resulting in higher potential on the electron flow limiting control electrode of said electron tube and therefore larger electron flow through said electron tube.

3. Electron tube protective apparatus comprising in combination, a driving signal source, an electron tube, said electron tube having a control grid, a cathode, an electron-flow control grid, and an anode, a driving signal source, an output circuit, input circuit and biasing means, means for coupling said driving signal source to the control grid of said electron tube utilizing said input circuit and biasing means whereby the electron flow through said electron tube varies inversely with respect to the amplitude of the driving signal from said driving signal source, an output load coupled to the anode of said electron tube, a variable impedance network responsive to a control voltage, potential means, means for coupling said variable impedance network and said potential means to the electron flow control grid of said electron tube whereby the potential at said electron flow control grid is responsive to said control voltage, means for producing a reference signal in said output circuit, said reference signal proportional to the amplitude of said driving signal from said driving signal source, and means for utilizing said reference signal to provide said control voltage whereby when the amplitude of said driving signal from said driving signal source decreases beyond a prescribed value, the impedance of said variable impedance network is adjusted by a suitable charge in control voltage to reduce the potential at said electron-flow control grid and therefore the electron flow in said electron tube.

4. A horizontal drive amplifier tube protector circuit in a television receiver comprising in combination a horizontal drive amplifier tube having a cathode, an anode, a control grid, a suppressor grid, and a screen grid, an input circuit, said input circuit connected between control grid and cathode of said horizontal drive amplifier tube and containing a fixed potential terminal, a horizontal discharge circuit, coupled to the input circuit of said horizontal drive-amplifier tube and supplying a signal of prescribed waveform and amplitude to said input circuit, an output circuit, means for coupling said output circuit between the anode and the fixed potential terminal in input circuit, a potential source having a positive voltage terminal and a negative voltage terminal, a two terminal current limiting impedance, means for connecting one terminal of said current limiting impedance to the screen grid of said horizontal drive amplifier tube, means for connecting the other terminal of said current limiting impedance to the positive voltage terminal of said potential source, means for connecting the negative voltage terminal of said potential source to said fixed potential terminal, a switch, said switch having a control electrode whereby for one range of potentials applied to said control electrode said switch opens, for another range of potentials applied to said control electrode said switch closes, means for developing a reference voltage in the output circuit of said horizontal drive amplifier tube with an amplitude which is a function of the magnitude of the signal from said horizontal discharge circuit, and means for coupling said reference voltage to said control electrode of said switch whereby when the reference voltage decreased beyond a prescribed value, said switch opens providing a voltage drop across said current limiting impedance which reduces voltage to said screen grid, when the reference voltage is above said prescribed value, said switch is closed providing substantially full voltage from said potential source to said screen grid.

5. A horizontal drive amplifier tube protector circuit in a television receiver comprising in combination a horizontal drive amplifier tube having a cathode, an anode, a control grid, a suppressor grid, and a screen grid, an input circuit, said input circuit connected between control grid and cathode of said horizontal drive amplifier tube and containing a fixed potential terminal, a horizontal discharge circuit coupled to the input circuit of said horizontal drive amplifier tube and supplying a signal of prescribed waveform and amplitude to said input circuit, an output circuit, means for coupling said output circuit between the anode and the fixed potential terminal in input circuit, a potential source having a positive voltage terminal and a negative voltage terminal, a two terminal current limiting impedance, means for connecting one terminal of said current limiting impedance to the screen grid of said horizontal drive amplifier tube, means for connecting the other terminal of said current limiting impedance to the positive voltage terminal of said potential source, means for connecting the negative voltage terminal of said potential source to said fixed potential terminal, an electron control tube, said electron control tube having a cathode, an anode, and at least a control grid, means for connecting the anode of said electron control tube to the positive potential terminal of said potential source, means for connecting the cathode of said electron control tube to the screen grid of said amplifier tube, means for developing a reference voltage in the output circuit of said horizontal drive amplifier tube with an amplitude which is a function of the magnitude of the signal from said horizontal discharge circuit, and means for coupling said reference voltage to said control grid of said electron control tube whereby when the magnitude of said reference voltage decreases beyond a prescribed value, said electron control tube is biased into substantially the region of cutoff thereby causing a voltage drop across said current limiting impedance and reducing the voltage applied to said screen grid and when said reference voltage increases in magnitude above said prescribed value, said electron control tube conducts heavily producing a substantial short circuiting of said current limiting impedance thereby restoring substantially full voltage from said potential source to said screen grid.

6. The invention as set forth in claim 5 and wherein a load resistor is included between the anode of said electron control tube and the positive potential terminal of said potential source.

7. A horizontal drive amplifier tube protector circuit in a television receiver comprising in combination a horizontal drive amplifier tube having a cathode, an anode, a control grid, a suppressor grid, and a screen grid, an input circuit, said input circuit connected between control grid and cathode of said horizontal drive amplifier tube and containing a fixed potential terminal, a horizontal discharge circuit, said horizontal discharge circuit coupled to the input circuit of said horizontal drive amplifier tube and supplying a signal of prescribed waveform and amplitude to said input circuit, a combined horizontal deflection circuit and radio frequency power supply, means for coupling said combined horizontal deflection circuit and radio frequency power supply between the anode and the fixed potential terminal in input circuit, a potential source having a positive voltage terminal and a negative voltage terminal, a two terminal current limiting impedance, means for connecting one terminal of said current limiting impedance to the screen grid of said horizontal drive amplifier tube, means for connecting the other terminal of said current limiting impedance to the positive voltage terminal of said potential source, means for connecting the negative voltage terminal of said potential source to said fixed potential terminal, an electron control tube, said electron control tube having a cathode, an anode, and at least a control grid, means for connecting the anode of said electron control tube to the positive potential terminal of said potential source, means for connecting the cathode of said electron control tube to said screen grid, means for developing a reference voltage in said combined horizontal deflection circuit and radio frequency power supply having an amplitude which is a function of the magnitude of the signal from said horizontal discharge circuit, and means for coupling said reference voltage to said control grid of said electron control tube whereby when the magnitude of said reference voltage decreases beyond a prescribed value, said electron control tube is biased into substantially the region of cutoff thereby producing a virtual open circuit across said current limiting impedance and reducing the voltage applied to said screen grid to a degree determined by said current limiting resistor and when said reference voltage increases in magnitude above said prescribed value, said electron control tube conducts heavily producing a substantial short circuiting of said current limiting impedance thereby restoring substantially full voltage from said potential source to said screen grid.

8. The invention as set forth in claim 7 and wherein the input circuit to said horizontal drive amplifier tube includes a self-biasing clipping circuit, said self-biasing clipping circuit causing said horizontal drive amplifier tube to bias off during a prescribed portion of the signal from said horizontal discharge circuit.

9. The invention as set forth in claim 7 and wherein said radio frequency power supply includes a high voltage winding, a means of rectification and a filter and load resistance circuit, said load resistor circuit providing a source of said reference voltage derived from the rectification and filtering of signals appearing across said high voltage winding utilizing said means of rectification and said filter circuit.

10. In a color television receiver of the type employing a color synchronizing burst, a combined burst keyer and horizontal drive amplifier protection device comprising in combination, a horizontal discharge output stage, said horizontal discharge output stage providing an output signal, a horizontal drive amplifier circuit, said horizontal drive amplifier circuit having an input stage, an output stage and an output stage current control terminal, means for coupling said horizontal discharge output circuit to the input stage of said horizontal drive amplifier circuit, said horizontal drive amplifier circuit characterized in that in a prescribed range of signal amplitudes from said horizontal discharge output stage, the current level in the output stage of said horizontal drive amplifier circuit varies inversely with respect to the amplitude level of the signal impressed at its input stage, means for developing a reference voltage in said output stage, said reference voltage in said output stage proportional to the amplitude level of the output of said horizontal discharge output stage, a deflection circuit, means for incorporating said deflection circuit in the output stage of said horizontal drive amplifier circuit, a kickback voltage winding, means for coupling said kickback voltage winding into said deflection circuit, a variable potential network having a potential control terminal which yields a potential from said variable potential network responsive to a control voltage impressed at said potential control terminal, a burst frequency amplifier responsive to said synchronizing burst and having a gate voltage terminal which may be utilized with an appropriate signal voltage to turn said burst frequency amplifier on during the burst, means for coupling said reference voltage to said potential control terminal whereby when the signal amplitude from said horizontal discharge output stage decreases below a specified value the current through the output stage of said horizontal drive amplifier circuit is limited to below a prescribed value, means for also coupling said kickback voltage winding to said potential control terminal, means for coupling said variable potential source to the gate voltage terminal of said burst frequency amplifier thereby utilizing said variable potential network coupled to said kickback voltage winding to turn said burst frequency amplifier on during the duration of the burst in addition to said variable potential network acting as a control of the current level in the output stage in said horizontal drive output circuit.

11. In a color television receiver of the type employing a color synchronizing burst, a combined burst keyer and horizontal drive protection device, comprising in combination, a horizontal discharge output stage, a horizontal drive amplifier circuit having an input stage and output stage, and an output stage current control terminal, means for coupling said horizontal discharge output circuit to the input stage of said horizontal drive amplifier circuit, said horizontal drive amplifier circuit characterized in that, for a prescribed range of signal amplitudes from said horizontal discharge output stage, the current level in the output stage of said horizontal drive amplifier circuit varies inversely with respect to the amplitude level of the signal impressed at its input stage, a combined deflection circuit and radio frequency power supply circuit, means for incorporating said combined deflection circuit and radio frequency power supply circuit in the output stage of said horizontal drive amplifier circuit, a kickback voltage winding, means for coupling said kickback voltage winding into said deflection circuit, a fixed potential terminal, a potential source, a variable impedance network, said variable impedance network having a control terminal with the impedance of said variable impedance network responsive to a voltage applied to said potential terminal, means for coupling said potential source and said variable impedance network between said fixed potential terminal and the output stage current control terminal whereby the current level in the output stage of said horizontal drive amplifier circuit is subject to control by the voltage impressed on said control terminal of said variable impedance network, means for developing a reference voltage in the combined deflection circuit and radio frequency power supply circuit, said reference voltage being proportional to the amplitude of the output of the horizontal discharge output circuit, means for coupling said reference voltage to the control terminal of said variable impedance network whereby when the output signal from the horizontal discharge output stage falls below a prescribed level the current level in the output stage of said horizontal drive amplifier circuit is not permitted to rise above a prescribed value, a burst frequency amplifier, said burst frequency amplifier responsive to said synchronizing burst and having a gate voltage terminal, said gate voltage terminal repsonsive to voltage which if above a prescribed value turns said burst frequency amplifier off, means for coupling said kickback voltage winding to said potential terminal of said variable impedance network, means for coupling said variable impedance network to the gate voltage terminal of said burst frequency amplifier, and means for adjusting the voltage developed by said kickback voltage winding to cause said variable impedance network to turn said burst frequency amplifier on during the duration of the burst.

12. The invention as described in claim 11 and wherein said variable impedance network consists of a current limiting resistor shunted by a damping electron tube, said damping electron tube having an anode, a cathode, and a control grid, with said reference voltage impressed upon said control grid whereby when the output of said horizontal discharge output circuit is above a prescribed level, said damping electron tube is rendered conducting thereby shunting and damping out said limiting resistor, and when the output of said horizontal discharge output circuit falls below a prescribed value, said damping electron tube is rendered nonconducting with said limiting resistor acting as a means of limiting the voltage applied to the output stage current control terminal of said horizontal drive amplifier circuit.

13. In a color television receiver of the type employing a color synchronizing burst, a combined burst keyer and horizontal drive amplifier current limiting device, comprising in combination, a horizontal discharge output stage providing a suitable horizontal discharge output signal, a horizontal drive amplifier tube having a cathode, an anode, a control grid, and at least a screen grid, a resistance-condenser network, said resistance-condenser network coupled to the control grid and cathode of said horizontal drive amplifier tube to yield an input circuit, said input circuit providing a self-biasing and clipping action responsive to signals impressed on this input circuit, means for coupling the output signal from said horizontal discharge output stage to said input circuit of said horizontal drive amplifier tube, a combined radio frequency power supply deflection circuit and kickback voltage source, means for coupling said radio frequency power supply and deflection circuit and kickback voltage source to the anode of said horizontal drive amplifier tube, a variable potential network, said variable potential network having a potential control terminal responsive to a control voltage impressed at said potential control terminal, means for providing a reference voltage in said radio frequency power supply, said reference voltage proportional to the amplitude level of the signal impressed at the input circuit of said horizontal drive amplifier tube, means for coupling said reference voltage to the potential control terminal of said variable potential network, a means of coupling said variable potential network to the screen grid of said horizontal drive amplifier tube whereby when the output signal from said horizontal discharge output stage falls below a prescribed level the potential impressed by said variable potential network on the screen grid of said horizontal drive amplifier tube will limit the current level through said horizontal drive amplifier tube to a prescribed range of values, means for coupling said kickback voltage winding to the potential control terminal of said variable potential network, a burst frequency amplifier, said burst frequency amplifier responsive to said synchronizing burst and having a gating voltage terminal, said gate voltage terminal responsive to an impressed voltage of suitable magnitude to turn said burst frequency amplifier on or off, means for coupling said variable potential network to the gate voltage terminal of said burst frequency amplifier whereby said kickback voltage winding develops a suitable kickback voltage in said variable potential network which in turn turns said burst frequency amplifier on during the duration of said color synchronizing burst.

14. In a color television receiver of the type employing a color synchronizing burst, a combined burst keyer and horizontal drive protection device comprising in combination a horizontal drive amplifier tube having an anode, a cathode, a control grid and at least a screen grid, a horizontal discharge circuit producing a waveform of prescribed form describing both the scan period and the retrace period, an input circuit coupled between said horizontal discharge circuit and characterized in that in one range of horizontal drive amplifier tube current, the current level varies inversely with respect to the amplitude of waveform produced by said horizontal discharge circuit, a horizontal deflection circuit including an inductance, means for coupling said horizontal deflection circuit to the anode of said horizontal drive amplifier tube, a high voltage transformer winding, means for coupling said high voltage transformer winding to said inductance of said horizontal deflection circuit to produce a high voltage across said high voltage transformer winding by utilizing collapsing magnetic fields associated with a prescribed portion of said waveform, a rectifier means, a filter network means, means for utilizing said rectifier means and said filter network means to produce a substantially direct current voltage, a potential source, a limiting resistor, an anode resistor, a protector keyer tube having an anode, a cathode, and a control grid, means for connecting a shunt connected circuit consisting of said protector keyer tube with said anode resistor connected to said anode as one member in shunt with said limiting resistor, means for connecting said shunt connected circuit in series with said potential source, a fixed potential terminal, means for connecting said shunt connected circuit in series with said potential source between the screen grid of said horizontal drive amplifier tube and said fixed potential terminal to establish a positive potential on said screen grid dependent upon the potential of the control grid of said horizontal drive amplifier tube, means for coupling a portion of the substantially direct current voltage to the control grid of said protector keyer tube whereby when the waveform of prescribed form developed by said hroizontal discharge circuit falls below a prescribed value, said protector keyer tube will be rendered nonconducting thereby causing a voltage drop across said limiting resistor which in turn produces a reduction in voltage on the screen grid of said horizontal drive amplifier tube thereby limiting the current through said horizontal drive amplifier tube to a prescribed range of values, and when the amplitude of the waveform developed by said horizontal discharge circuit increases to above said prescribed value of amplitude, said protector keyer tube will be rendered conducting thereby producing a damping action across said limiting resistor resulting in an increase in voltage developed on the screen grid of said horizontal drive amplifier tube thereby increasing the current level through said horizontal drive amplifier tube, a burst separator circuit, said burst separator tube having an anode, a control grid, a cathode, a screen grid and a suppressor grid, a first resonant circuit, said first resonant circuit responsive to the frequency of said color synchronizing burst, means for coupling said first resonant circuit to the control grid of said burst separator tube, a source of video signals, said video signals including said color synchronizing burst, means for coupling said source of said video signals to said first resonant circuit, a second resonant circuit, said second resonant circuit responsive to the frequency of said color synchronizing burst, means for coupling said second resonant circuit to the anode of said burst separator tube, means for utilizing any burst signal developing across said second resonator circuit for color selection in said color television receiver, a kickback voltage winding, means for coupling said kickback voltage winding to said high voltage transformer winding to produce a kickback voltage, means for coupling said kickback voltage winding to the control grid of said protector keyer tube whereby conduction of said protector keyer is varied in accordance to the waveform provided by said kickback voltage winding, means for coupling the anode of said protector keyer tube to the cathode of said burst separator tube, and means for adjusting the waveform produced by said kickback voltage winding whereby the change in potential of the anode of said protector keyer tube, as developed by the change in conduction developed in said keyer tube thereby causing a corresponding voltage drop across said anode resistor, may be utilized for turning said burst separator tube on during the duration of the color synchronizing burst.

15. The invention as described in claim 14 and wherein there is provided an auxiliary rectifier filter load network, said rectifier filter load network also coupled to said high voltage transformer winding to provide said substantially direct current voltage for controlling the action of said protector keyer tube, and means for utilizing said auxiliary rectifier filter load network for also providing regulation of the output voltage provided by said filter network means.

16. Electron tube protective apparatus comprising in combination, an electron tube having an input circuit, and an output circuit, and at least one current control electrode, a driving signal source coupled to said input circuit, means for developing a reference voltage in the output circuit of said electron tube, said reference voltage having an amplitude proportional to the amplitude of the driving signal from said driving signal source, a potential terminal, an electron control device means coupled between said potential terminal and said current control electrode and responsive to said reference voltage for controlling the potential at said current control electrode.

17. A current overload protection system for an amplifier circuit comprising in combination a driving signal amplifier stage having an input circuit, an output circuit and a current control terminal, a driving signal, means for coupling said driving signal to the input circuit of said driving signal amplifier stage, means for developing a reference voltage proportional to the amplitude of said driving signal in the output circuit of said driving amplifier stage, and electron tube means including a potential source for applying a voltage to said current control terminal of said driving amplifier stage responsive to said reference voltage for controlling the current through said driving signal amplifier stage.

18. A deflection drive amplifier protector circuit in a television receiver comprising in combination, a deflection drive signal source, a horizontal drive amplifier circuit having an input circuit, an output circuit and an electron control device, said electron control device having an electron-flow control terminal, means for coupling said deflection drive signal source to the input circuit of said deflection drive amplifier circuit, means for producing a reference voltage bearing relationship to the amplitude of said drive signal in the output circuit of said deflection drive amplifier circuit, and an electron control device means including a voltage source for applying a prescribed fraction of the output of said voltage source to said electron-flow control terminal responsive to said reference potential whereby when the amplitude of said deflection drive signal falls below a prescribed value, the electron flow through said electron-flow control device is caused to not exceed a suitable value.

References Cited in the file of this patent

UNITED STATES PATENTS

| | | |
|---|---|---|
| 2,458,532 | Schlesinger | Jan. 11, 1949 |
| 2,579,627 | Tourshou | Dec. 25, 1951 |
| 2,584,213 | Longo | Feb. 5, 1952 |
| 2,589,299 | Setchell | Mar. 18, 1952 |
| 2,612,622 | Thalner | Sept. 30, 1952 |
| 2,627,052 | Helpert | Jan. 27, 1953 |